United States Patent [19]

Ott et al.

[11] Patent Number: 4,748,896

[45] Date of Patent: Jun. 7, 1988

[54] SAFETY VALVE ASSEMBLY

[75] Inventors: Helmut Ott, Stuttgart; Günter Baldauf, Rommelshausen, both of Fed. Rep. of Germany

[73] Assignee: Herion-Werke KG, Fellbach, Fed. Rep. of Germany

[21] Appl. No.: 26,861

[22] Filed: Mar. 17, 1987

[30] Foreign Application Priority Data

May 6, 1986 [DE] Fed. Rep. of Germany ....... 3615369

[51] Int. Cl.[4] .............................................. F15B 11/08
[52] U.S. Cl. ...................................... 91/448; 91/461; 137/596.14; 137/596.16
[58] Field of Search ................ 91/420, 421, 426, 433, 91/445, 446, 448, 461, 304; 137/596.14, 596.16, 596.18

[56] References Cited

U.S. PATENT DOCUMENTS

| Re. 31,161 | 3/1983 | Mahorney | 137/596.16 |
|---|---|---|---|
| 3,265,089 | 8/1966 | Nill | 137/596.16 |
| 4,083,381 | 4/1978 | McClocklin et al. | 137/596.16 |
| 4,257,455 | 3/1981 | Cameron | 137/596.16 |
| 4,353,392 | 10/1982 | Ruchser et al. | 137/596.16 |
| 4,542,767 | 12/1985 | Thornton et al. | 137/596.18 |

Primary Examiner—Robert E. Garrett
Assistant Examiner—Therese Newholm
Attorney, Agent, or Firm—Henry M. Feiereisen

[57] ABSTRACT

A safety valve assembly for regulating the flow of a fluid under pressure to a fluid operated system e.g. a double acting cylinder element includes a housing with an inlet port, outlet ports and working ports and accommodating a pair of parallel valve spindles which are controllable by respective pilot valves so as to be shiftable between two valve positions. Each valve spindle is provided with a working piston, valve piston and a control piston which cooperates with a respective valve seat as defined by the housing. The control pistons of the valve spindles are successively disposed in a passageway extending between one of the working ports and one of the outlet ports.

9 Claims, 3 Drawing Sheets

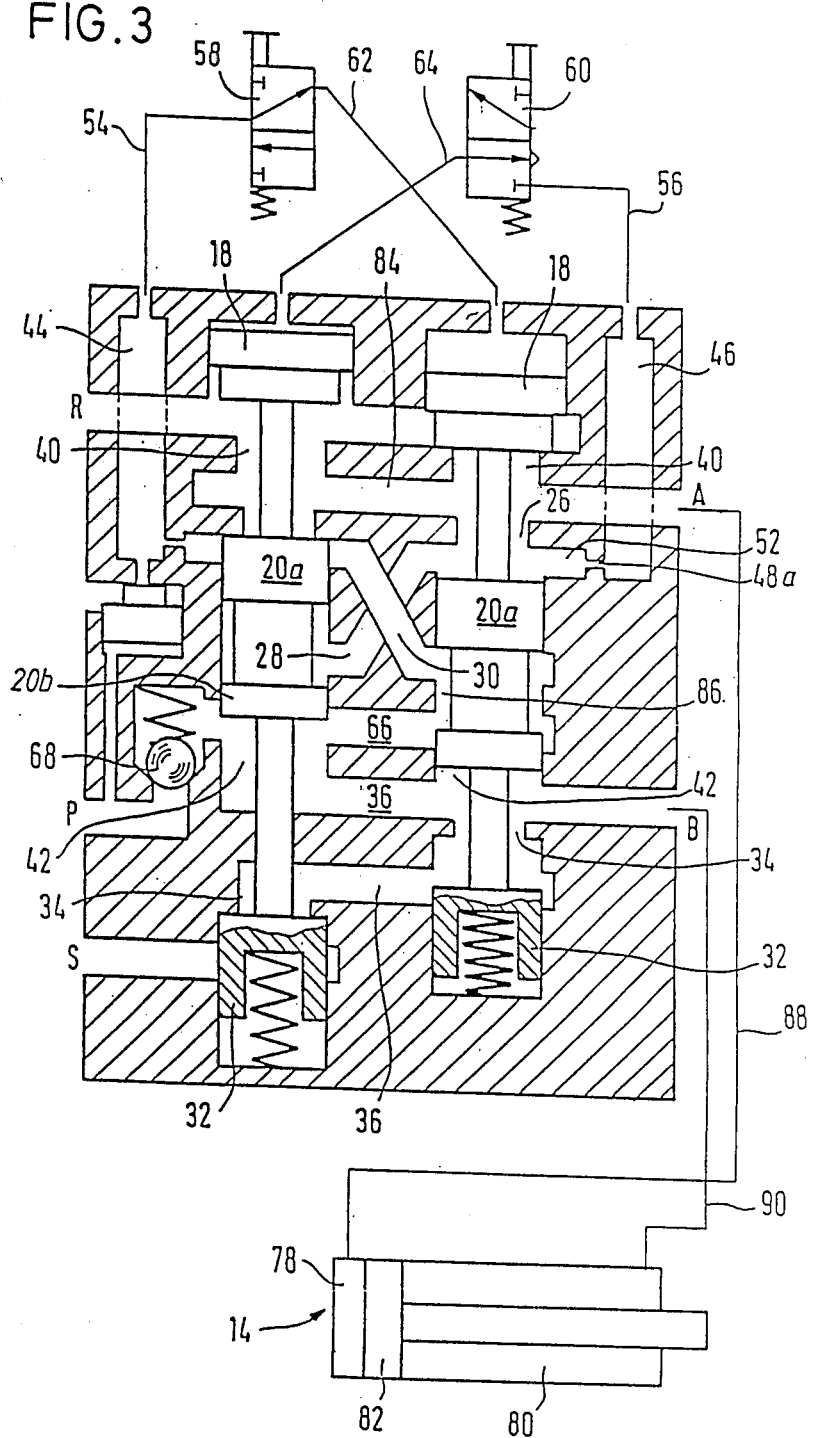

SAFETY VALVE ASSEMBLY

FIELD OF THE INVENTION

The invention refers to a safety valve, in particular to a five-way/four-way directional control valve.

BACKGROUND OF THE INVENTION

Such safety valves may be provided with an inlet port, two working ports and two outlet ports and used for cooperating with pressure actuated working elements as e.g. double acting cylinder of presses. The safety valves include two parallel valve spindles actuated by suitable pilot valves which communicate with pertaining reservoirs to supply the required pressure. Each of the valve spindles is provided with a working piston and a valve piston with the valve pistons linked to each other via crossing channels.

Safety valves of this kind are used in the technical field e.g. for controlling the clutch and brake of eccentric presses. In devices, however, which are actuated bidirectional e.g. double acting cylinders, control systems are used which for safety reasons are very complicated, e.g. two-way valves with electronic monitoring system and complicated safety controls.

SUMMARY OF THE INVENTION

It is thus an object of the present invention to provide an improved safety valve obviating the afore-stated drawbacks.

This object and others which will become apparent hereinafter are attained in accordance with the present invention by providing each valve spindle with a control piston at its axial end opposite to the working piston and by successively disposing the control pistons of the valve spindles within a passageway extending from one of the working ports to one of the outlet ports. The control pistons are preferably biased by a spring in closing direction thereof so as to sealingly engage pertaining valve seats of the housing.

According to a feature of the invention, a vent valve is disposed in vicinity of the inlet port to prevent a return of pressure fluid during normal operation and to maintain the pressure during interruption of supply of pressure fluid.

The valve spindles are each actuated by a pilot valve which communicates with a respective reservoir providing the supply of fluid under pressure. Preferably, a vent valve is provided in a passageway close to the inlet port for connecting at least one of the reservoirs with a vent orifice when the supply of fluid is interrupted for any reason.

The safety valve assembly of the present invention comprises two mutually monitoring valve systems without requiring any additional safety elements or monitoring devices for observing each switch position. In case one of the valve systems has a malfunction, the other valve system can be operated only after eliminating the malfunction first. Thus, double acting devices can reliably switched off when a malfunction is encountered.

BRIEF DESCRIPTION OF THE DRAWING

The above and other objects, features and advantages of the present invention will now be described in more detail with reference to the accompanying drawing in which:

FIG. 3 is a cross section of the safety valve of FIG. 1 at maloperation.

DESCRIPTION OF PREFERRED EMBODIMENTS

Figure 1:
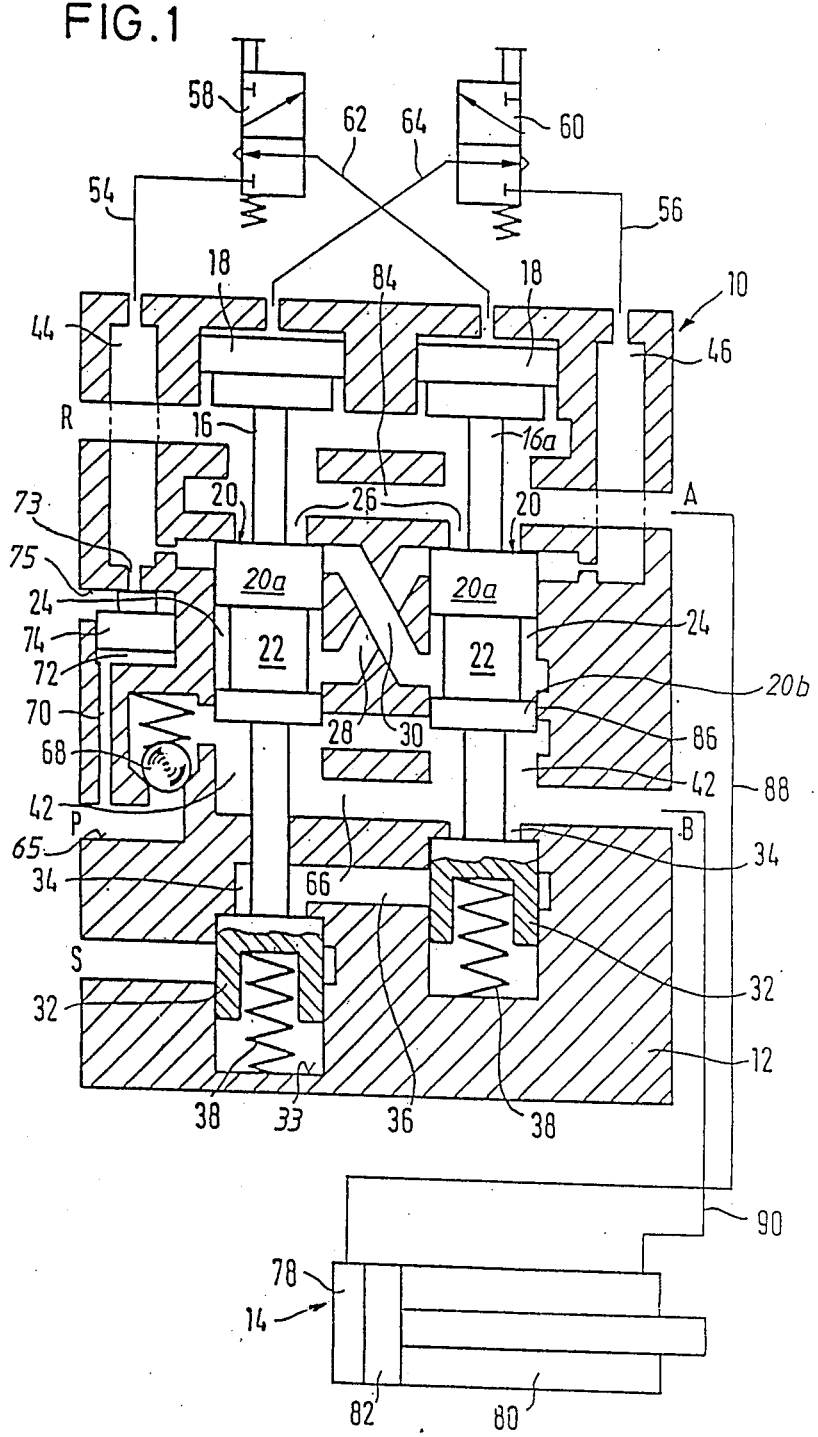
FIG. 1 is a cross section of one embodiment of a safety valve according to the invention in idle position.

In the drawing, there is shown in cross sectional view a safety valve generally designated by reference numeral 10 and provided for controlling a double acting cylinder element 14 with a longitudinally slidable piston element 82 which divides the cylinder element 14 into two chambers 78, 80. The safety valve 10 is actuated by a pair of pilot valves 58, 60 which are operated manually, mechanically, electrically, electromagnetically or by pressure or by any other suitable means, and has a housing 12 with one inlet port P, two working ports A, B and two outlet ports R, S.

The working port B is connected with the chamber 80 by a line 90 while the working port A communicates via line 88 with the chamber 78 of the double acting cylinder element 14 so that pressure can be applied to both sides of the piston element 82 to attain its reciprocating movement.

The housing 12 accommodates a pair of parallel valve spindles 16, 16a. Each of the valve spindles 16, 16a is provided with a working piston 18 at one axial end thereof which cooperates with a respective valve seat 40. Spaced to its working piston 18, each valve spindle 16, 16a supports a double valve piston 20 which includes an upper piston portion 20a and a lower piston portion 20b linked to each other by a rod 22. The rod 22 extends between the spaced upper and lower piston portions 20a, 20b at a central section thereof and is of smaller diameter than the diameter of the valve piston 20 so that an annular space 24 is defined between the circumference of each rod 22 and the surrounding inner wall surface of the housing 12.

The valve piston 20 of each valve spindle 16, 16a controls with its upper piston portion 20a a valve seat 26 while its lower piston portion 20b opens and closes alternatingly a valve seat 86 and a valve seat 42. In the idle position of the safety valve 10 as illustrated in FIG. 1, the valve piston 20 closes the valve seat 26 as well as the valve seat 86 while the valve seat 42 is open. Extending between the valve spindles 16, 16a is a through-let chamber 84 so that depending on the position of the working pistons 18 and the valve pistons 20, the flow between the working port A, on the one hand, and the outlet port R or inlet port P, on the other hand, is regulated via the chamber 84. In addition, the valve pistons 20 alternatingly open and close the connection of the inlet port P with the working port A and working port B.

Accommodated within the housing 12 is a reservoir 44 which is connected via a line 54 to the pilot valve 58. Via a line 62, the pilot valve 58 is connected with the working piston 18 of the valve spindle 16a so that upon actuation of the pilot valve 58 pressure is applied onto the working piston 18. In like manner, a further reservoir 46 is provided which is connected to the pilot valve 60 via line 56, and a line 64 links the pilot valve 60 with the working piston 18 of the valve spindle 16.

The reservoir 44 is in communication via a bore 48 with an annular channel 50 (FIG. 2) which in turn is connected to a passageway 30 leading to the annular space 24 of the valve spindle 16a. In like manner, the reservoir 46 is in communication via a bore 48a with an annular channel 52 (FIG. 2) which in turn is connected to a passageway 28 leading to the annular space 24 of the valve spindle 16. Both annular spaces 24 are thus connected via crossing passageways 28, 30 with the passageway 28 extending from the annular space 24 at the valve spindle 16 to the bore of the valve piston 20 of the valve spindle 16a immediately before its valve seat 26, and with the passageway 30 extending from the annular space 24 at the valve spindle 16a to the bore of the pertaining valve piston 20 immediately before its valve seat 26.

At its other axial end at a distance to the valve piston 20, each valve spindle 16, 16a is provided with a control piston 32 of inverted U-shape. The control pistons 32 regulate the flow of fluid within a passageway 36 extending between the working port B and the outlet port S by cooperating with respective valve seats 34 defined by the housing 12. As shown in the drawing, the control pistons 32 are successively disposed in the passageway 36 with the valve spindle 16a being of shorter length than the length of the valve spindle 16. The control pistons 32 are each movably guided in a bore 33 of the housing 12 and are biased by a pressure spring 38 which extends between the inner wall surface of the bore 33 and the base section of the inverted U-shaped control piston 32 and urges the pertaining control piston 32 in closing position i.e. in direction toward its valve seat 34.

A passageway 65 extends from the inlet port P to a chamber 66 and includes a spring loaded nonreturn valve 68 which prevents a return flow of pressure fluid in passageway 65 from the chamber 66 to the inlet port P. Branching off the passageway 65 near the inlet port P is a line 70 which leads to a chamber 72 accommodating a vent valve 74 biased in opening direction e.g. by a not shown spring. Connecting the reservoir 44 with the chamber 72 is a bore 73 which usually is sealed off by the vent valve 74 as the pressure fluid flowing into the chamber 72 from the inlet port P forces the vent valve 74 against the bore 73.

The chamber 72 is also provided with a vent orifice 75 which is closed by the vent valve 74 during normal operating conditions. When e.g. encountering an interruption of supply of pressure fluid, the vent valve 74 clears the opening 75 so that the reservoir 44 is connectable e.g. to the atmosphere.

After having described the individual parts and structure of the safety valve 10 according to the invention, its mode of operation will now be explained in more detail.

FIG. 1 shows the safety valve 10 in its idle position in which the pilot valves 58, 60 are closed so that no pressure is applied to the working pistons 18. The pressure springs 38 force the control pistons 32 into the upper, closing position so that the valve spindles 16, 16a occupy a switch position in which the connection between working port A and outlet port R is open as the working pistons 18 are disengaged from their valve seat 40 while the connection between the working port A and inlet port P is interrupted because the lower piston section 20b of valve piston 20 closes valve seat 86. Since, thus, the valve seat 42 is open, the connection between inlet port P and working port B is open as well while the connection between working port B and outlet port S is interrupted by the control pistons 32 which sealingly engage the respective valve seats 34.

Therefore, pressure fluid flows from the inlet port P through passageway 65 via nonreturn valve 68 and chamber 66 to working port B and then via line 90 into the chamber 80 of the cylinder element 14. As the other chamber 78 of the cylinder element 14 is ventilated because working port A is connected via chamber 84 to the outlet port R, the piston element 82 moves to the left until occupying the position as shown in FIG. 1.

If for any reason, the pressure supply through inlet port P is interrupted, the piston element 82 would still remain in this position—even upon vertical arrangement of the cylinder element 14—as the nonreturn valve 68 prevents a return flow of pressure fluid from chamber 66. In addition, the connection between working port B and outlet port S is also interrupted as both valve seats 34 are engaged by the control pistons 32. A flow of the pressure flow to working port A is prevented as the valve pistons 20 engage the pertaining valve seats 86.

Simultaneously with the interruption of the supply of pressure fluid to inlet port P, the line 70 and chamber 72 become pressureless and the vent valve 74 clears the bore 73 and the vent orifice 75. The reservoir 44 is thus in communication via vent opening 75 with the atmosphere. Thus, the pilot valve 58 cannot be supplied with pressure fluid and the working piston 18 of valve spindle 16 cannot be actuated by the pressure fluid.

Figure 2:
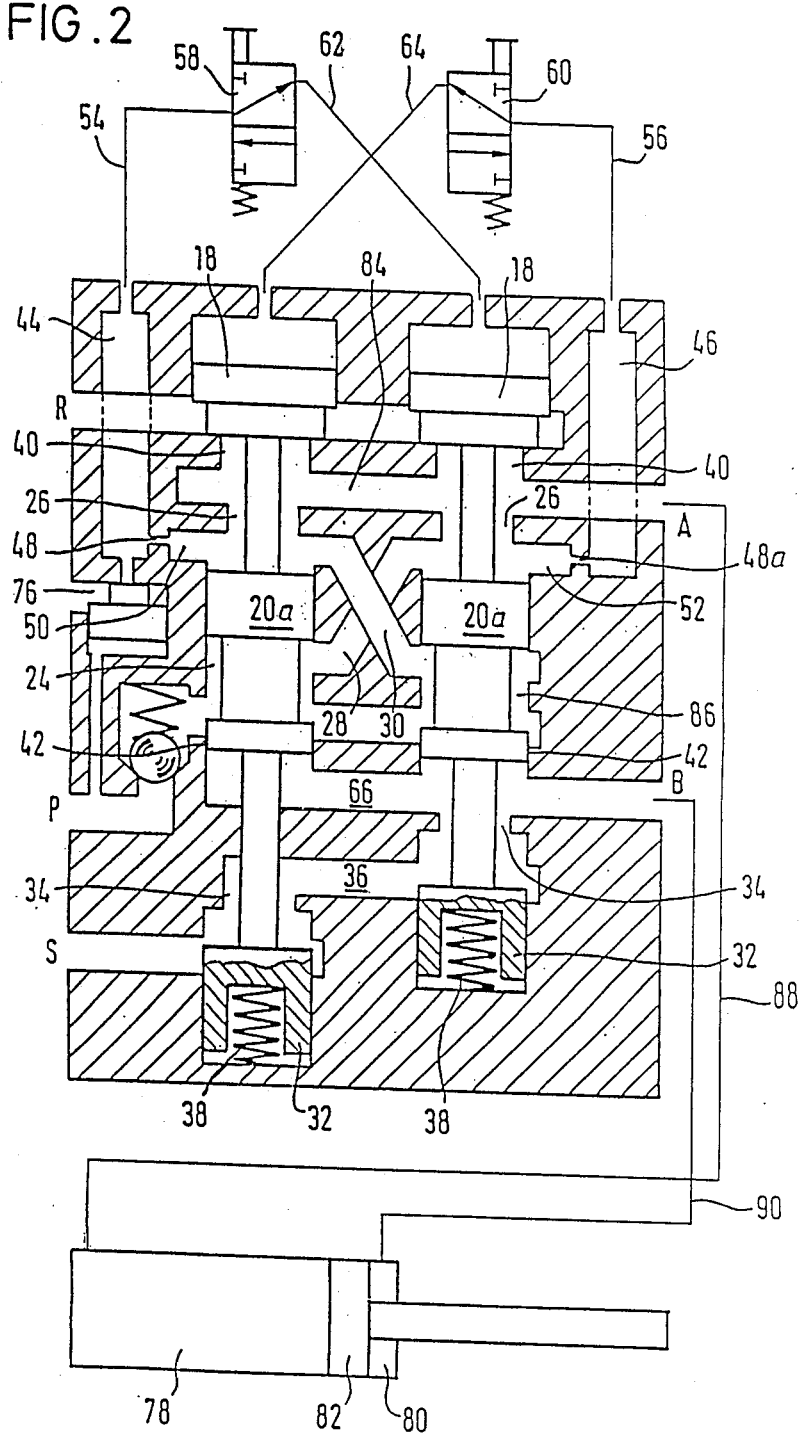
FIG. 2 is a cross section of the safety valve of FIG. 1 in switch position.

Even when actuating the pilot valve 60 at this point and applying pressure onto the working piston 18 of the valve spindle 16 so that the latter is shifted into the position as shown in FIG. 2, the piston element 82 will still retain its position as shown in FIG. 1 as the connection between working port B and outlet port S is still interrupted by the control piston 32 of valve spindle 16a while the connection between working port B and working port A is closed by the valve piston 20 because—as already mentioned—the working piston 18 of the valve spindle 16a retains its position as shown in FIG. 1 regardless whether or not pilot valve 58 is actuated.

Consequently, the safety valve 10 can be operated only after eliminating the malfunction.

When now reversing both pilot valves 58, 60 into the switch position as shown in FIG. 2, pressure fluid flows onto the working pistons 18 from the pertaining reservoirs 44, 46 via the pilot valves 58, 60 and lines 62, 64 so that the valve spindles 16, 16a are shifted into the position as shown in FIG. 2. Accordingly, working port B is connected via passageway 36 to outlet port S as the control pistons 32 are moved against the force of the pressure springs 38 to clear the valve seats 34 while the connection between inlet port P and working port B is interrupted by the lower piston portions 20b of the valve pistons 20 engaging the valve seats 42. Pressure fluid thus flows out of chamber 80 of the cylinder element 14 to the outlet port S.

Simultaneously, the inlet port P is connected with the working port A as the the valve pistons 20 disengage from valve seats 86 and valve seats 26 so that the pressure fluid flows from the inlet port P into the annular spaces 24 and via the crossing passageways 28, 30 and the open valve seats 26 into the chamber 84 and eventually to working port A. The connection between working port A and outlet port R is interrupted by the working pistons 18 which close the valve seats 40 while the connection between working port A and outlet port S is interrupted by the valve pistons 20 engaging the valve seats 42.

Thus, pressure fluid is admitted into the chamber 78 of the cylinder element 14 from the working port A via line 88 so that the piston element 82 is moved to the right as shown in FIG. 2.

Turning now to FIG. 3 which shows a cross section of the safety valve 10 at a maloperation or malfunction. When actuating e.g. only the pilot valve 58 or in case the latter gets stuck in its actuated position, pressure fluid flows only to the working piston 18 of the valve spindle 16a so that the latter is shifted into the working position while the other valve spindle 16 remains in the idle position as its working piston 18 is not acted upon by the fluid under pressure. Consequently, the reservoir 46 is in communication with the outlet port R via bore 48, annular channel 52, open valve seat 46 of the valve piston 20 of the valve spindle 16a, chamber 84 and open valve seat 40 of the working piston 18 of valve spindle 16, and thus becomes pressureless.

Even when actuating the pilot valve 60 at this point, no pressure can be applied onto the working piston 18 to shift the valve spindle 16a into the switching position. The working port A which is in communication via chamber 84 with the outlet port R remains pressureless while working port B is still under pressure as the pressure fluid flows from the inlet port P via nonreturn valve 68, the chamber 66 and open valve seat 42 of valve piston 20 of valve spindle 16 to the working port B.

Despite the fact that the control piston 32 of the valve spindle 16a is disengaged from its valve seat 34, the working port B is prevented from communicating with the outlet port S as the control piston 32 of valve spindle 16 engages its valve seat 34. Thus, pressure is maintained in chamber 80 of the cylinder element 14 while chamber 78 is ventilated via the working port A so that the piston element 82 remains in the position as shown in FIG. 3.

Therefore, the safety valve 10 cannot be reversed even upon actuation of the pilot valves 58, 60. Only when removing the malfunction can the safety valve 10 be operated again i.e. in the described nonlimiting example the supply of pressure fluid to the inlet port P is first to be discontinued and the pilot valves 58, 60 are to be brought into their idle position. Upon discontinuing the supply of pressure fluid, the valve spindles 16, 16a under the action of the springs 38 occupy their idle position as shown in FIG. 1.

After resuming the supply of pressure fluid to the inlet port P, the safety valve 10 can be operated again.

It should be noted that the maloperation or malfunction has been described only by way of a nonlimiting example. Certainly, when actuating only the pilot valve 60 instead of the pilot valve 58 or when one of the valve spindles 16, 16 gets stuck between its idle position and switch position, the safety valve 10 operates in the same manner as described.

While the invention has been illustrated and described as embodied in a Safety Valve Assembly, it is not intended to be limited to the details shown since various modifications and structural changes may be made without departing in any way from the spirit of the present invention.

What is claimed as new and desired to be protected by Letters Patent is set forth in the appended claims:

1. A safety valve assembly for regulating the flow of a pressure fluid to a fluid operated system; comprising:
    a housing with an inlet port, two outlet ports and two working ports each communicating with said inlet port via a parallel connection and adapted to be connectable with the fluid operated system to allow alternate supply of pressure fluid to the latter; and
    valve means accommodated in said housing for regulating the flow of the pressure fluid and including two valve spindles each having a working piston at one axial end thereof, a valve piston arranged at a distance to said working piston and a control piston at its other axial end thereof,
    one of said working ports being connectable to one of said outlet ports via a respective fluid-carrying passageway wherein said control piston of said valve spindles are arranged in series in said one fluid-carrying passageway so that upon a faulty operation of said valve means said one working port is prevented from communicating with said one outlet port for maintaining its working position.

2. A safety valve assembly as defined in claim 1 wherein said housing defines valve seat means cooperating with said control pistons to regulate the flow of fluid in said one passageway.

3. A safety valve assembly as defined in claim 2, and further comprising spring means biasing said control pistons to urge said valve spindles into one of said valve positions and to force said control pistons against said valve seat means.

4. A safety valve assembly as defined in claim 3 wherein each of said control pistons is of inverted U-shape and movable within a bore of said housing, said spring means including a spring extending with said bore.

5. A safety valve assembly as defined in claim 4, and further comprising a nonreturn valve located within said inlet port to prevent escape of pressure fluid and to maintain pressure when the supply of pressure fluid is interrupted.

6. A safety valve assembly as defined in claim 1, and further comprising a vent valve acted upon by the pressure fluid admitted through said inlet port, said housing accommodating at least one reservoir cooperating with said vent valve in such a manner that upon interruption of supply of fluid said reservoir is ventilated.

7. A safety valve assembly as defined in claim 6 wherein said housing accommodates a chamber communicating with said reservoir via a bore and provided with a vent orifice, said vent valve being disposed within said chamber and being disengageable from said bore and said vent orifice when the supply of fluid is interrupted.

8. A safety valve assembly as defined in claim 1 wherein said valve spindles are arranged parallel to each other.

9. A safety valve assembly as defined in claim 1 wherein said valve pistons are linked to each other via crossing fluid-carrying passageways.

* * * * *